(12) United States Patent
Beser

(10) Patent No.: US 7,761,598 B1
(45) Date of Patent: Jul. 20, 2010

(54) SYSTEMS AND METHODS FOR CONNECTING LARGE NUMBERS OF CABLE MODEMS

(75) Inventor: Nurettin Burcak Beser, Sunnyvale, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 1801 days.

(21) Appl. No.: 10/378,858

(22) Filed: Mar. 5, 2003

Related U.S. Application Data

(60) Provisional application No. 60/436,008, filed on Dec. 26, 2002.

(51) Int. Cl.
G06F 15/16 (2006.01)
G06F 15/173 (2006.01)

(52) U.S. Cl. .................... 709/245; 709/226

(58) Field of Classification Search ........... 709/218, 709/226, 227, 228, 245
See application file for complete search history.

(56) References Cited

U.S. PATENT DOCUMENTS

| | | | | |
|---|---|---|---|---|
| 5,734,656 A * | 3/1998 | Prince et al. | ................ | 370/401 |
| 5,809,012 A * | 9/1998 | Takase et al. | ................ | 370/229 |
| 5,835,723 A * | 11/1998 | Andrews et al. | ........... | 709/226 |
| 6,028,860 A * | 2/2000 | Laubach et al. | ....... | 370/395.64 |
| 6,028,933 A * | 2/2000 | Heer et al. | ................. | 713/169 |
| 6,070,246 A * | 5/2000 | Beser | ............................ | 726/2 |
| 6,185,624 B1 * | 2/2001 | Fijolek et al. | ............... | 709/239 |
| 6,331,987 B1 * | 12/2001 | Beser | ......................... | 370/486 |
| 6,438,123 B1 * | 8/2002 | Chapman | .................... | 370/351 |
| 6,490,727 B1 * | 12/2002 | Nazarathy et al. | ........... | 725/129 |
| 6,510,162 B1 * | 1/2003 | Fijolek et al. | ............... | 370/432 |
| 6,594,280 B1 * | 7/2003 | Chapman | .................... | 370/469 |
| 6,795,851 B1 * | 9/2004 | Noy | ........................... | 709/218 |
| 6,950,399 B1 * | 9/2005 | Bushmitch et al. | ......... | 370/236 |
| 7,113,484 B1 * | 9/2006 | Chapman et al. | ............ | 370/252 |
| 7,171,453 B2 * | 1/2007 | Iwami | ........................ | 709/218 |
| 7,194,009 B2 * | 3/2007 | Eng | ............................ | 370/480 |
| 7,197,033 B2 * | 3/2007 | Reeves et al. | ............... | 370/389 |
| 7,197,565 B2 * | 3/2007 | Abdelaziz et al. | ........... | 709/226 |
| 7,216,175 B1 * | 5/2007 | Sitaraman et al. | ........... | 709/229 |
| 7,496,110 B1 * | 2/2009 | Beser | ......................... | 370/458 |
| 7,639,617 B2 * | 12/2009 | Chapman et al. | ............ | 370/235 |
| 7,656,890 B2 * | 2/2010 | Chapman et al. | ............ | 370/431 |
| 7,672,230 B2 * | 3/2010 | Chapman et al. | ............ | 370/225 |
| 2003/0035442 A1 * | 2/2003 | Eng | ............................ | 370/486 |
| 2003/0079028 A1 * | 4/2003 | Kortum et al. | .............. | 709/229 |
| 2003/0202534 A1 * | 10/2003 | Cloonan | .................... | 370/468 |
| 2007/0038753 A1 * | 2/2007 | Jorgensen | ................... | 709/226 |
| 2007/0140298 A1 * | 6/2007 | Eng | ............................ | 370/485 |
| 2009/0180490 A1 * | 7/2009 | Beser | ......................... | 370/431 |

OTHER PUBLICATIONS

Data-Over-Cable Service Interface Specifications; Radio Frequency Interface Specification; SP-RFIv1.1-I08-020301; Mar. 1, 2002; pp. 181-200 and 267-268.
Data-Over-Cable Service Interface Specifications; Baseline Privacy Plus Interface Specification; SP-BPI+-I04-000407; Apr. 7, 2000; pp. 1-176.

* cited by examiner

*Primary Examiner*—Douglas B Blair
(74) *Attorney, Agent, or Firm*—Harrity & Harrity, LLP

(57) ABSTRACT

Identifiers are assigned to devices communicating via a number of virtual channels. If additional identifiers are needed, one or more new virtual channels are created and the identifiers are reused for the new virtual channel.

18 Claims, 9 Drawing Sheets

SYSTEMS AND METHODS FOR CONNECTING LARGE NUMBERS OF CABLE MODEMS

RELATED APPLICATION

This application claims priority under 35 U.S.C. §119 based on U.S. Provisional Application No. 60/436,008, filed Dec. 26, 2002, the disclosure of which is incorporated herein by reference.

BACKGROUND OF THE INVENTION

1. Field of the Invention

The present invention relates generally to data transfer and, more particularly, to data transmission via a cable modem system.

2. Description of Related Art

Conventional cable modem systems include a cable modem termination system (CMTS) connected to one or more cable modems via a coaxial cable. The CMTS communicates with the cable modems via a radio frequency (RF) interface and provides packet forwarding functions via a network side interface. Separate frequency bands are used for upstream and downstream communication on the coaxial cable. For example, the upstream communication may take place on communication channels within the 5-42 MHz frequency band and the downstream communication may take place on communication channels within the 88-860 MHz frequency band.

One or more upstream communication channels may be bundled with one or more downstream communication channels to form a Media Access Control (MAC) domain. The MAC domain provides a broadcast network impression, such that a packet sent on an upstream channel may be broadcast to all of the cable modems connected to the downstream channel. The CMTS can have one or more MAC domains, where each of the MAC domains may be associated with one or more cable modems.

Data-Over-Cable Service Interface Specification (DOCSIS) is the standard for cable modem systems throughout the world. DOCSIS dictates that service identifiers be assigned to the cable modems by the CMTS. Each cable modem is assigned a different one of the service identifiers. As a result, there is a limit on the number of cable modems that can connect to the CMTS. This limit is based on the number of available service identifiers. In existing systems, there are approximately 8,000 different service identifiers, resulting in approximately 8,000 different cable modems that can connect to the CMTS.

In an embedded DOCSIS environment where there are devices that do not require large amounts of data to be exchanged, the 8,000 limit on the number of cable modems is inadequate.

As a result, there is a need for systems and methods for increasing the number of cable modems that may connect to a CMTS.

SUMMARY OF THE INVENTION

Systems and methods consistent with the principles of the invention address this and other needs by using virtual upstream channel techniques to permit an increased number of cable modems to connect to a CMTS. The virtual upstream channel techniques permit the service identifiers to be reused.

One aspect consistent with the principles of the invention includes a system that assigns identifiers to devices communicating via a number of virtual channels. The system assigns identifiers to the devices and determines whether additional identifiers are needed. When additional identifiers are needed, the system creates a new virtual channel and reuses the identifiers for the new virtual channel.

In another aspect consistent with the principles of the invention, a CMTS is provided. The system includes a downstream processor, an upstream processor, and a system manager. The downstream processor is configured to transmit data to cable modems via one or more downstream channels. The upstream processor is configured to receive data from the cable modems via one or more upstream channels, where at least one of the one or more upstream channels includes multiple virtual channels. The system manager is configured to assign identifiers to the cable modems, determine whether additional identifiers are needed, create a new virtual channel when additional identifiers are needed, and reuse the identifiers for the new virtual channel.

In yet another aspect consistent with the principles of the invention, a method for allocating transmission opportunities for communicating via a number of virtual channels is provided. The method includes receiving bandwidth requests from the devices via the virtual channels, where the bandwidth requests include identifiers; identifying the devices based on the identifiers and the virtual channels on which the bandwidth requests were received; and allocating transmission opportunities for the identified devices.

In a further aspect consistent with the principles of the invention, a method for identifying security information associated with communications with a device is provided. The method includes creating an identifier based on an address of the device and a security identifier; and determining, from the identifier, the security information associated with communications with the device.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

Systems and methods consistent with the principles of the invention provide virtual upstream channel techniques and reuse service identifiers to thereby permit an increased number of cable modems to connect to a CMTS.

System Configuration

Figure 1:
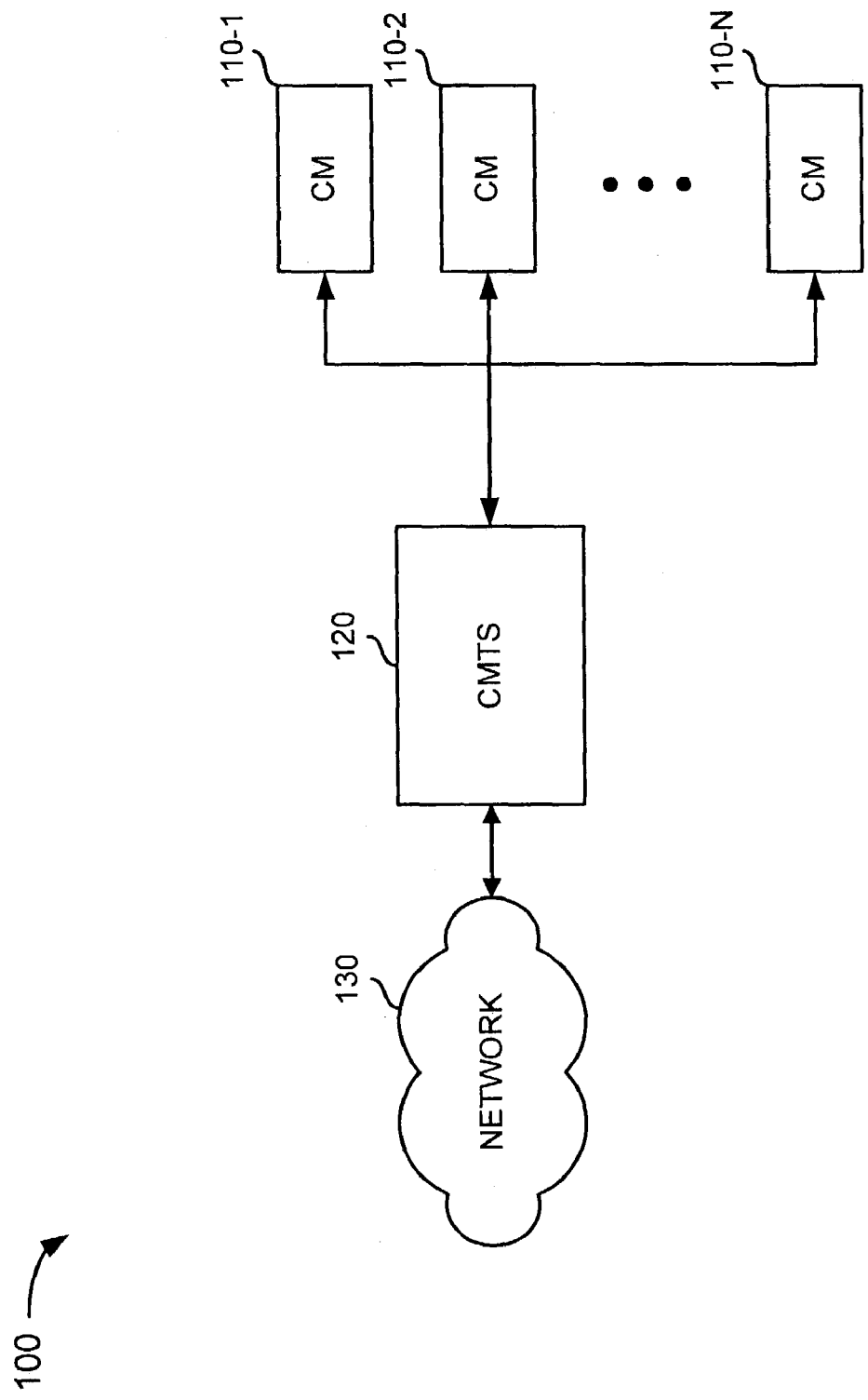
FIG. 1 is a block diagram illustrating an exemplary cable system in which systems and methods consistent with principles of the invention may be implemented.

FIG. 1 is a block diagram illustrating an exemplary cable system 100 in which systems and methods consistent with the principles of the invention may be implemented. System 100 may include N (where N≧1) cable modems (CMs) 110-1, 110-2, ..., 110-N (referred to collectively as CMs 110) connected to a CMTS 120 and a network 130. Network 130 may include any type of network, such as a wide area network, a local area network, an intranet, the Internet, the Public Switched Telephone Network, or another type of network.

CMs 110 may include devices, such as cable modems, that are available from a number of manufacturers. CMs 110 may receive data from CMTS 120 via a downstream path and send the data to one or more connected devices, such as computers, televisions, telephones, or other types of devices that receive, process, and/or transmit data. CMs 110 may also transmit data to CMTS 120 via an upstream path.

CMTS 120 may facilitate communication between CMs 110 and network 130. CMTS 120 may be maintained by a cable company at a facility in relative proximity to CMs 110. CMTS 120 may transmit data to CMs 110 via downstream channels on the downstream path and receive data from CMs 110 via upstream channels on the upstream path. For example, a group of CMs 110 may be served by 16 upstream channels and 4 downstream channels. The downstream channels may be higher bandwidth channels than the upstream channels. CMs 110 may share both upstream and downstream channels by time-multiplexing data on each of these channels. CMs 110 transmit data to CMTS 120 on the upstream channels during pre-assigned time slots.

Figure 2:
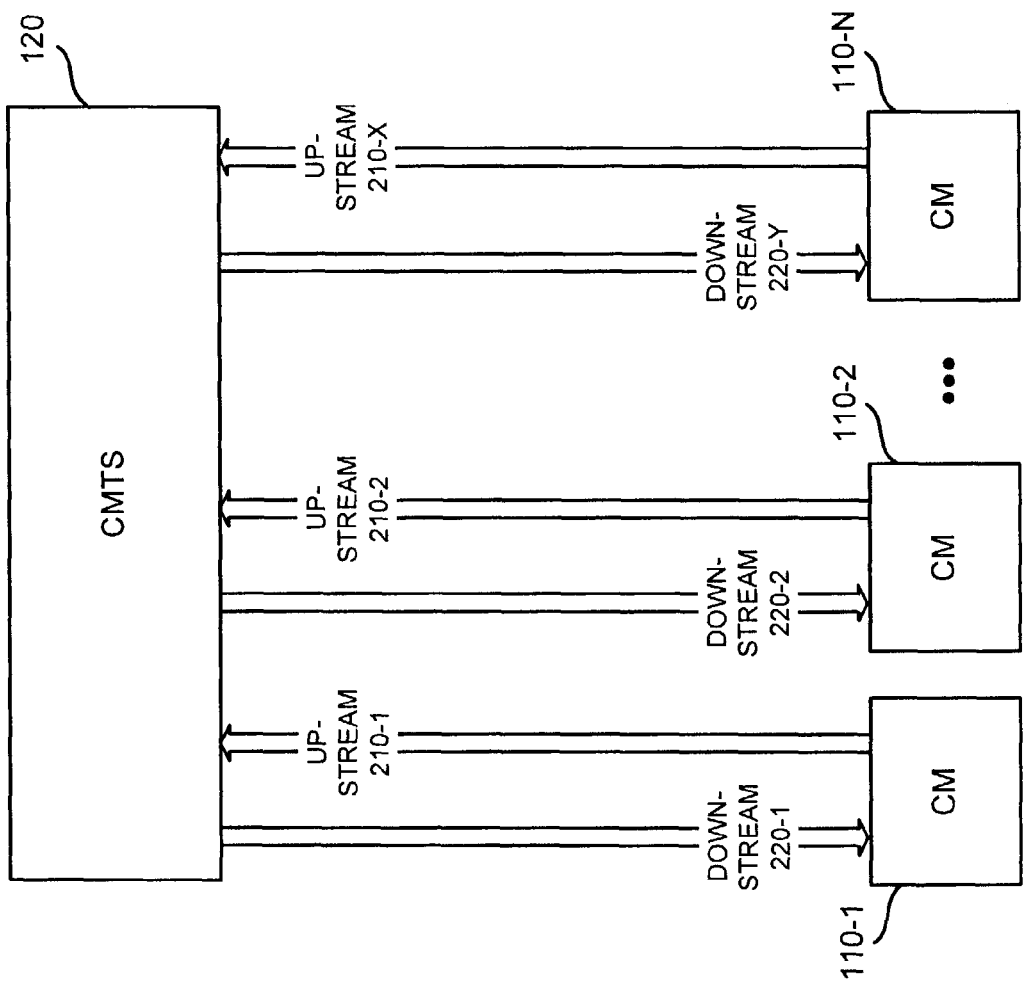
FIG. 2 is an exemplary diagram of communication channels that may be used for communication in the cable system of FIG. 1 according to an implementation consistent with the principles of the invention.

FIG. 2 illustrates exemplary upstream and downstream communication between CMs 110 and CMTS 120 according to an implementation consistent with the principles of the invention. As illustrated in FIG. 2, CMs 110 and CMTS 120 interconnect via upstream channels 210-1, 210-2, ..., 210-X (referred to collectively as upstream channels 210) and downstream channels 220-1, 220-2, ..., 220-Y (referred to collectively as downstream channels 220); where X≧1 and Y≧1.

Figure 3:
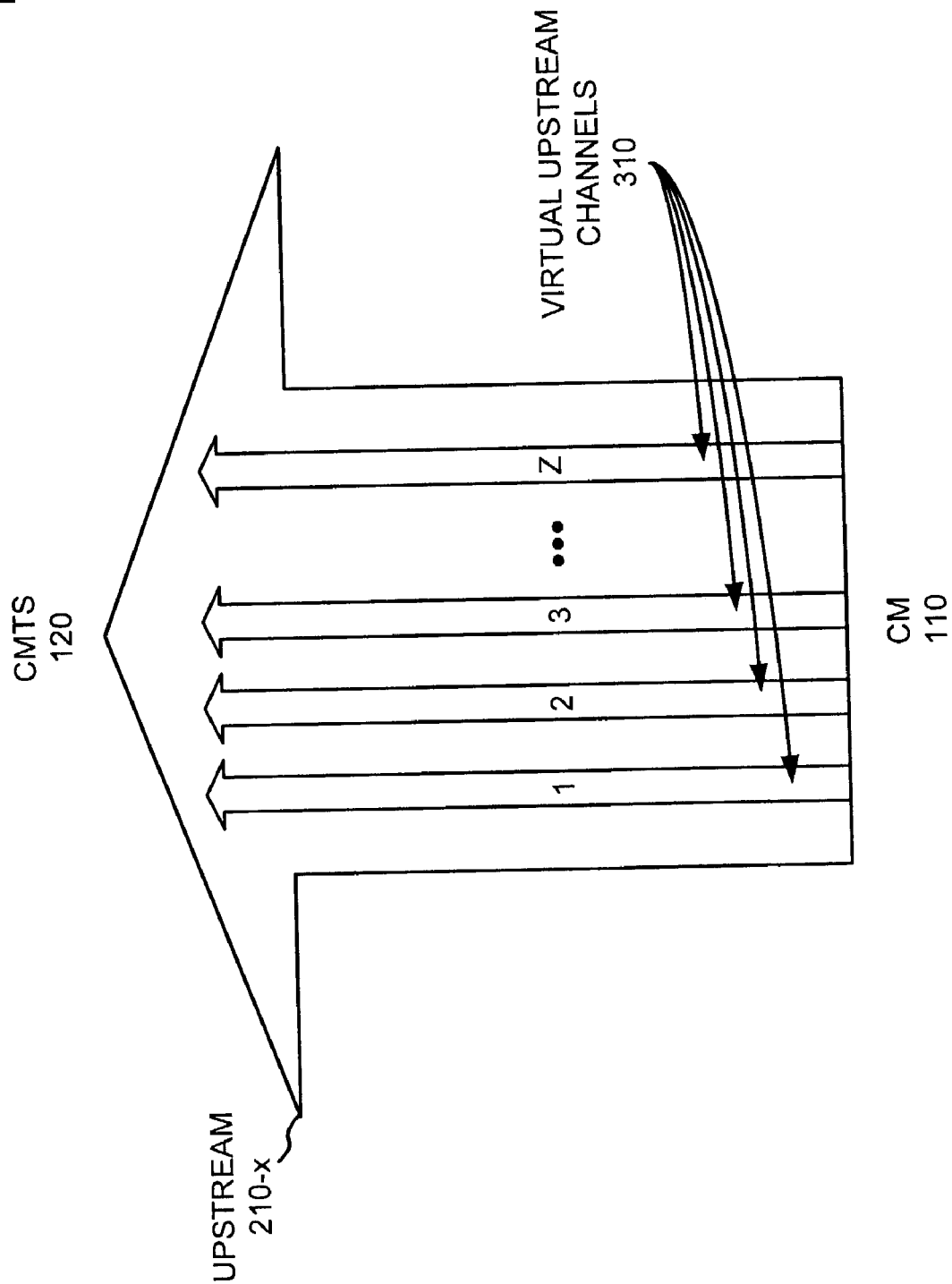
FIG. 3 is an exemplary diagram of an upstream channel of FIG. 2 according to an implementation consistent with the principles of the invention.

Each upstream channel 210-x and downstream channel 220-y may communicate via a different frequency band. Each upstream channel 210-x may further include multiple "virtual" channels. FIG. 3 is an exemplary diagram of an upstream channel 210-x according to an implementation consistent with the principles of the invention. As shown in FIG. 3, upstream channel 210-x may include multiple virtual upstream channels 310-1, 310-2, ..., 310-Z (referred to collectively as virtual upstream channels 310), where Z≧2.

Each of virtual upstream channels 310 may include a multiplexed timeslot of the upstream channel frequency. Each of virtual upstream channels 310 may further be associated with different transmission characteristics of CMs 110. Upstream channels 210 from CMs 110 may, thus, include frequency bandwidth divided into multiple channels, with each channel possibly further time division multiplexed into multiple virtual upstream channels.

Figure 4:
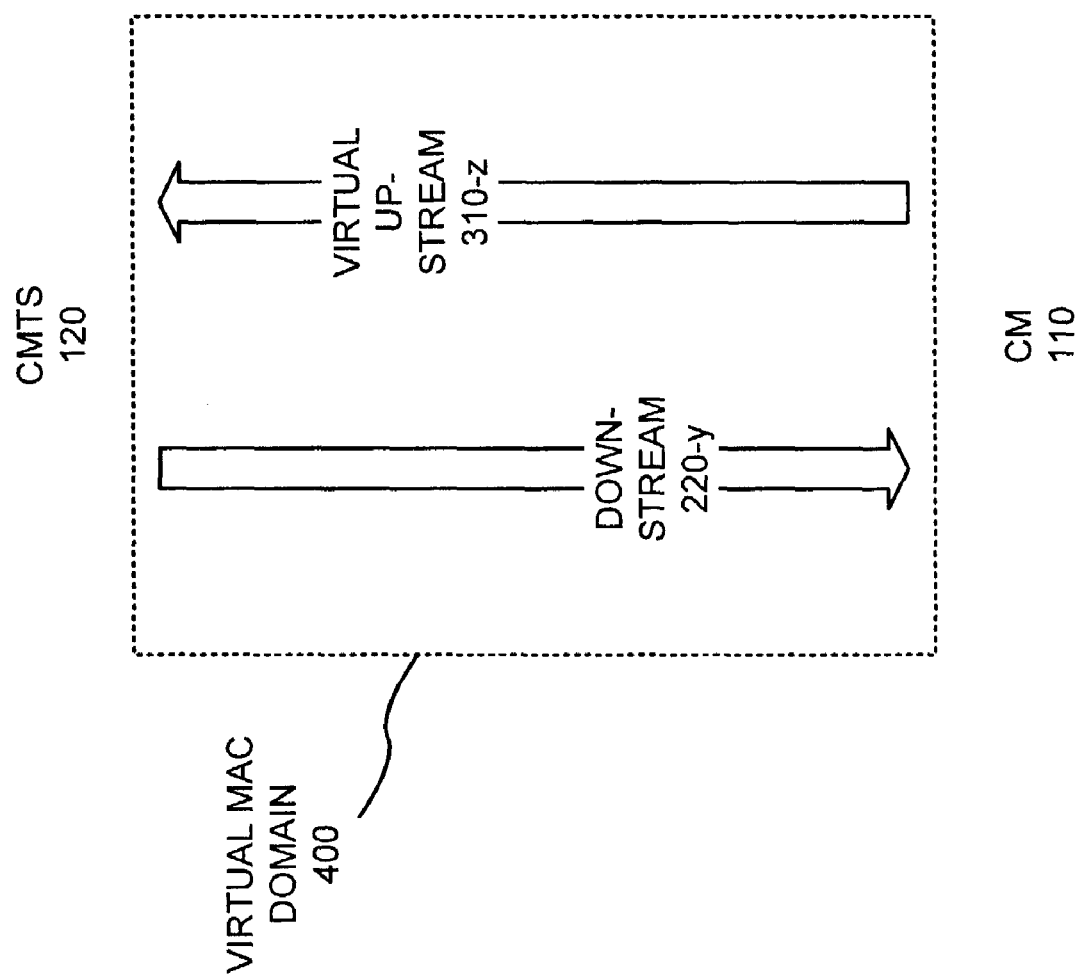
FIG. 4 is an exemplary diagram of a virtual MAC domain according to an implementation consistent with the principles of the invention.

FIG. 4 is an exemplary diagram of a virtual MAC domain 400 that may be formed in accordance with the principles of the invention. Using CM 110 by way of example, a virtual upstream channel, such as virtual upstream channel 310-z, may be linked with downstream channel 220-y to form virtual MAC domain 400. CMTS 120 may include one or more virtual MAC domains 400. Each virtual MAC domain 400 may be associated with one or more of CMs 110. Even though virtual MAC domain 400 has been shown as including a single virtual upstream channel 310-z and a single downstream channel 220-y, virtual MAC domain 400 may include one or more of virtual upstream channels 310 and/or one or more of downstream channels 220 in implementations consistent with the principles of the invention.

Exemplary Cable Modem Termination System Configuration

Figure 5:
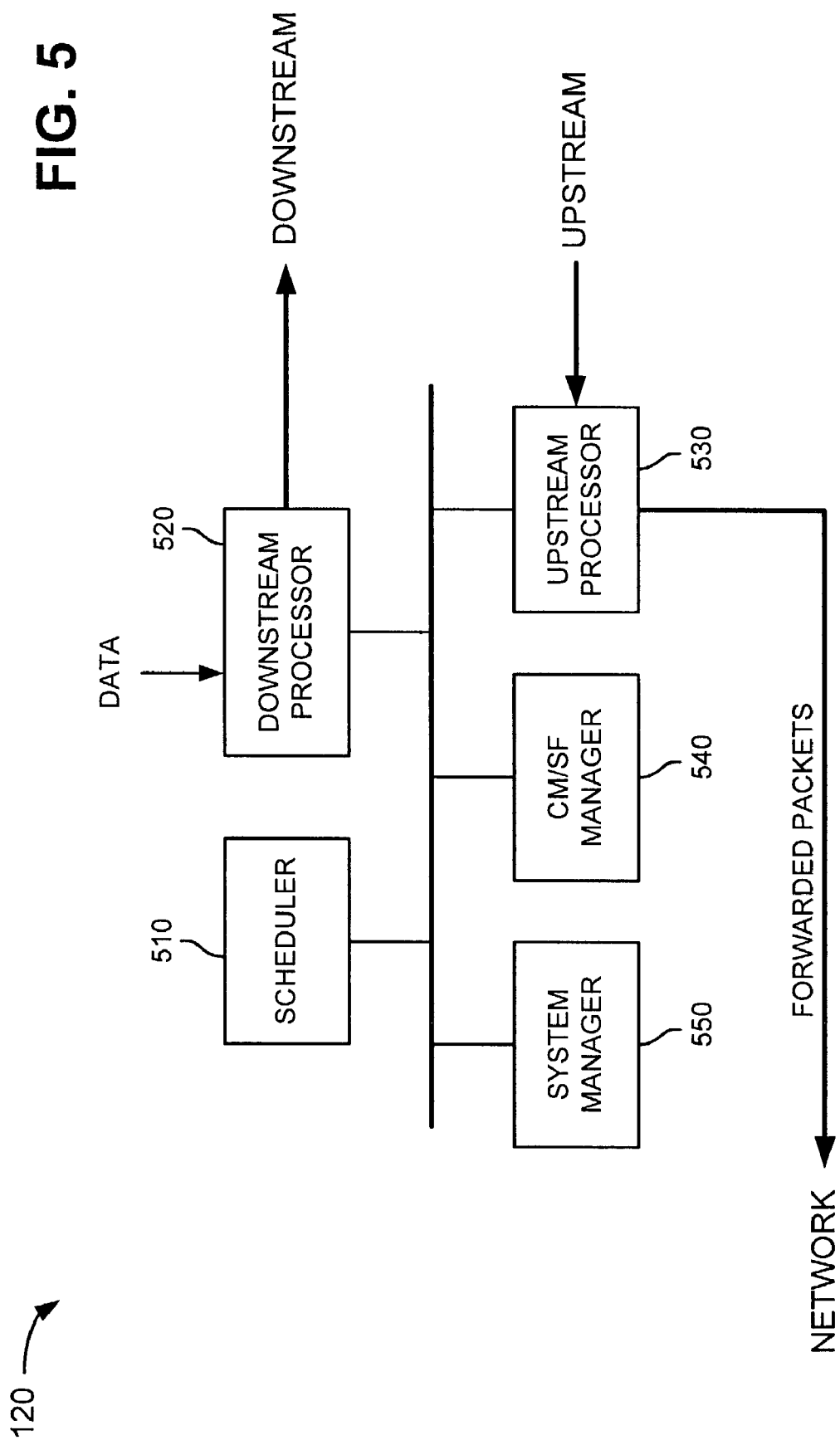
FIG. 5 is an exemplary diagram of the CMTS of FIG. 1 according to an implementation consistent with the principles of the invention.

FIG. 5 is an exemplary functional block diagram of CMTS 120 according to an implementation consistent with the principles of the invention. CMTS 120 may include a scheduler 510, a downstream processor 520, an upstream processor 530, a cable modem/service flow (CM/SF) manager 540, and a system manager 550. Downstream processor 520 may connect to the downstream path (from CMTS 120 to CMs 110). Upstream processor 530 may connect to the upstream path (from CMs 110 to CMTS 120).

Scheduler 510 may include logic that schedules transmission opportunities in the upstream direction. Scheduler 510 may receive requests for the transmission of data from CMs 110 and allocate transmission opportunities to CMs 110 for the transmission of some or all of the data.

Downstream processor 520 may include logic that receives information regarding the transmission opportunities allocated by scheduler 510 and generates messages, such as manufacturing automation protocol (MAP) messages, from this information. A MAP message is a downstream message that informs CMs 110 when to transmit on the upstream path. Downstream processor 520 may also include logic that receives data intended for CMs 110 and transmits the data, possibly in the form of one or more packets, to CMs 110.

Upstream processor 530 may include logic that separates data from control messages that it receives from CMs 110 on the upstream path. Some of the control messages may include bandwidth requests for future transmission opportunities. Upstream processor 530 may also buffer data fragments (e.g., fragments of a packet). Upstream processor 530 may reassemble the data fragments and transmit the reassembled fragments via network 130 (FIG. 1).

CM/SF manager 540 may include logic that tracks information regarding which CMs 110 are connected, the service flows associated with each CM 110, and the quality of service associated with each of the service flows. CM/SF manager 540 may use data gathered through the process of registration and the setting up of service flows to determine this information.

System manager 550 may include logic that controls many aspects of CMTS 120. For example, system manager 550 may control the creation of new virtual upstream channels and reuse of service identifiers (SIDs) and security association identifiers (SAIDs). The SIDs may be used by CMs 110 for bandwidth requests and by scheduler 510 for scheduling transmission opportunities for CMs 110. The SAIDs may be associated with security information that CMTS 120 and CMs 110 share to support secure communications between them. The shared information may include traffic encryption keys and initialization vectors (e.g., Cipher Block Chaining (CBC) initialization vectors) that may be exchanged using DOCSIS MAC management messages. SAIDs are described in more detail in Data-Over-Cable Service Interface Specifications, "Baseline Privacy Plus Interface Specification SP-BPI+-I04-000407," Apr. 7, 2000.

System manager 550 may assign the SIDs and the SAIDs based on the virtual MAC domains. In other words, system manager 550 may reuse the limited number of SIDs and SAIDs within each of the virtual MAC domains. As a result, the number of CMs 110 that may connect to CMTS 120 is practically unlimited.

Whenever system manager 550 runs out of available SIDs within a virtual MAC domain, system manager 550 creates a new virtual upstream channel and uses the new virtual upstream channel to create a new virtual MAC domain. System manager 550 may then reuse the SIDs within the new virtual MAC domain. Because the SIDs are reused, system manager 550 cannot use the SIDs to uniquely identify CMs 110. Therefore, system manager 550 may use additional information to identify CMs 110. For example, system manager 550 may use a combination of the SID and the channel number associated with each of virtual upstream channels 310 used by a CM 110-n to uniquely identify CM 110-n for scheduling transmission opportunities.

Whenever system manager 550 runs out of available SAIDs, system manager 550 simply reuses them. As a result, system manager 550 cannot use the SAIDs to uniquely identify security information. Therefore, system manager 550 may use additional information to identify the security information. For example, system manager 550 may use a combination of the SAID and the MAC address of a CM 110-n to uniquely identify security information associated with communication of CM 110-n.

Figure 6:
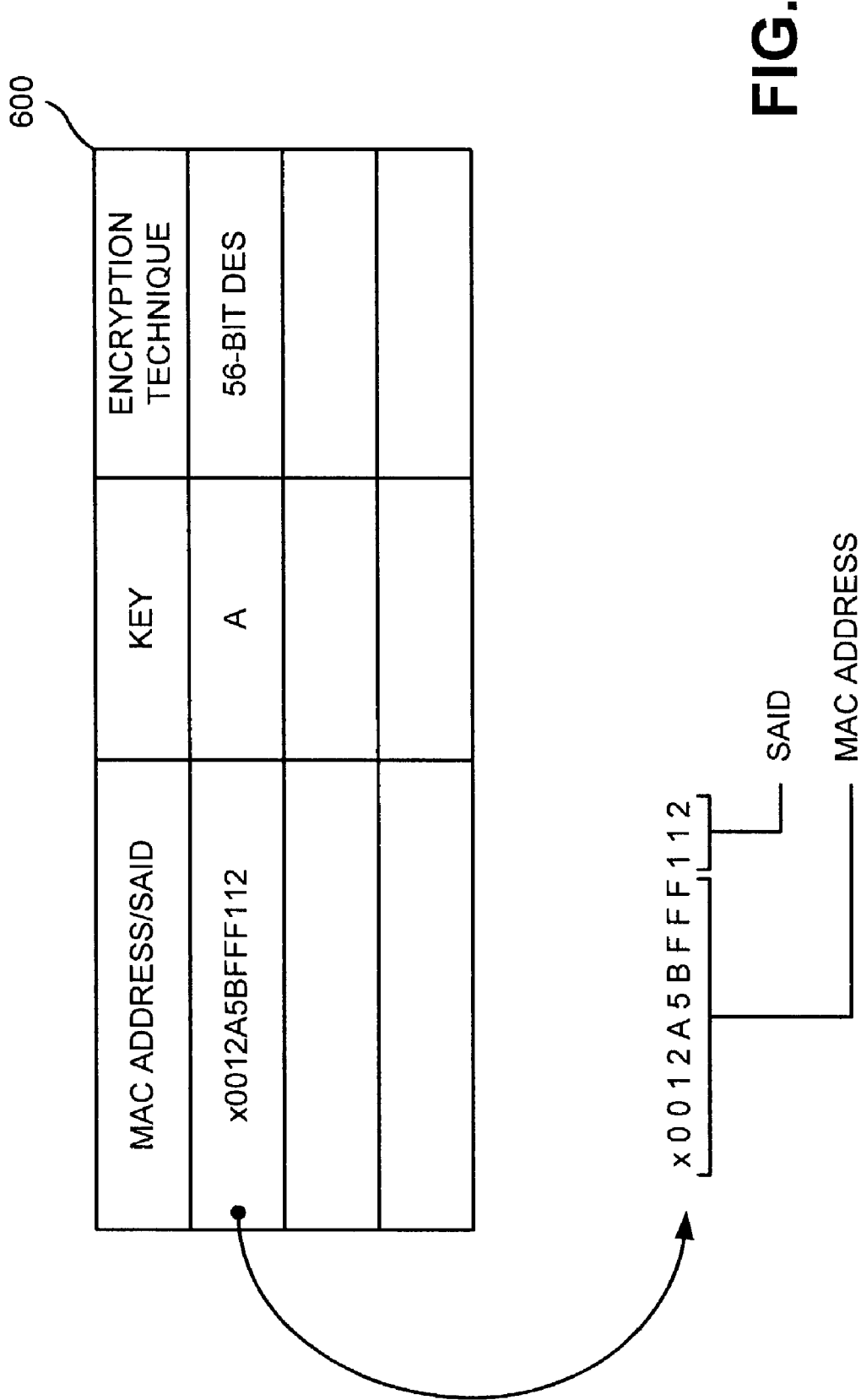
FIG. 6 is a diagram of an exemplary table that may be used by the CMTS of FIG. 5 according to an implementation consistent with the principles of the invention.

System manager 550 may maintain a table that maps an identifier formed by combining the MAC address of a CM 110-n and the SAID to an encryption key and/or an encryption technique or algorithm. FIG. 6 is a diagram of an exemplary table 600 according to an implementation consistent with the principles of the invention. In the exemplary entry of table 600, an identifier formed by combining the MAC address x0012A5BFFF and the SAID 112 maps to an encryption key of A and an encryption technique of 56-bit Data Encryption Standard (DES).

Exemplary SID Processing

Figure 7:
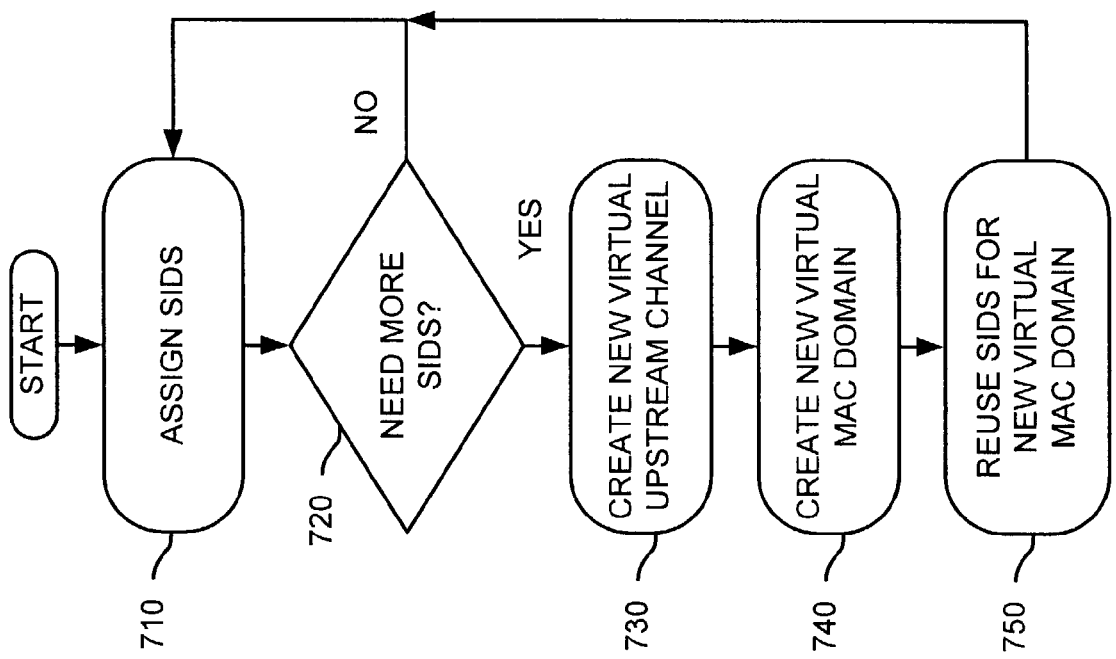
FIG. 7 is a flowchart of exemplary processing for assigning service identifiers in a manner consistent with the principles of the invention.

FIG. 7 is a flowchart of exemplary processing for assigning SIDs in a manner consistent with the principles of the invention. CMTS 120 may assign SIDs to CMs 110 on a periodic or regular basis (act 710). For example, when new CMs 110 connect to CMTS 120, CMTS 120 may assign the new CMs 110 any available SIDs for one or more available virtual upstream channels 310. CMTS 120 may use the SIDs when identifying CMs 110 communicating via upstream channels 210. The same group of SIDs may be associated with each one of virtual upstream channels 310 within a particular upstream channel 210-x. CMTS 120 may reuse the SIDs for different ones of virtual upstream channels 310.

When CMTS 120 runs out of available SIDs, CMTS 120 creates a new virtual upstream channel (acts 720 and 730). CMTS 120 may then form a new virtual MAC domain that links the new virtual upstream channel to one of downstream channels 220 (act 740). CMTS 120 may reuse the SIDs for the new virtual MAC domain (act 750). CMTS 120 may then assign one or more of these reused SIDs to one or more CMs 110 desiring to connect to CMTS 120 on the new virtual upstream channel.

Figure 8:
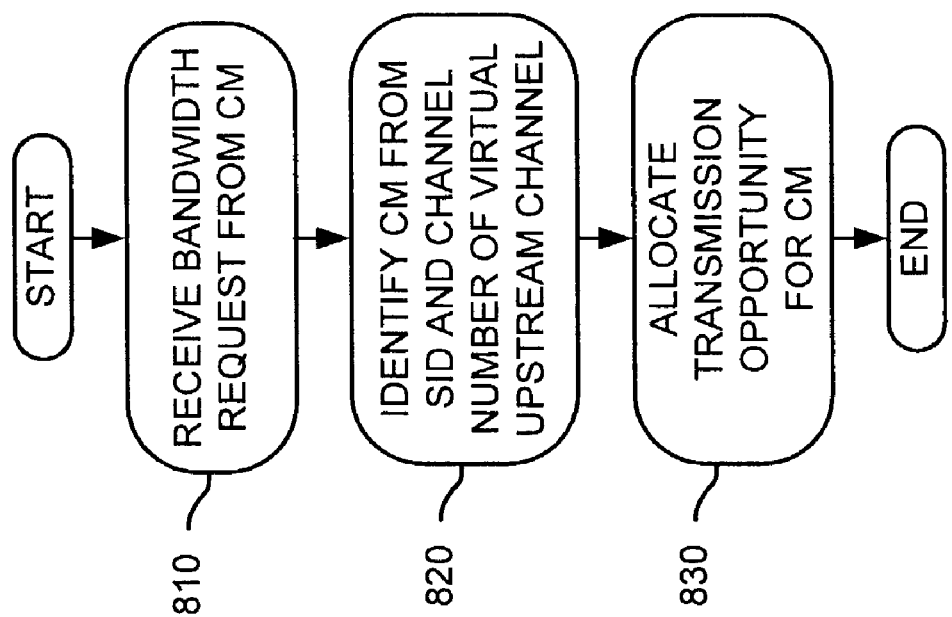
FIG. 8 is a flowchart of exemplary processing for allocating transmission opportunities according to an implementation consistent with the principles of the invention.

FIG. 8 is a flowchart of exemplary processing for allocating transmission opportunities according to an implementation consistent with the principles of the invention. Periodically, CMTS 120 may receive bandwidth requests from one or more of CMs 110 (act 810). The bandwidth request for CM 110-n, for example, may include the SID assigned to CM 110-n and, possibly, the channel number of one of virtual upstream channels 310 used by CM 110-n.

CMTS 120 may use a combination of the SID and the channel number of the virtual upstream channel 310 to uniquely identify CM 110-n (act 820). CMTS 120 may then allocate a transmission opportunity for CM 110-n (e.g., a time slot during which CM 110-n can transmit) to satisfy some or all of its request (act 830). CMTS 120 may generate a MAP message that identifies this allocated time slot and send the MAP message, possibly along with other information, to CM 110-n. CM 110-n may, thereafter, transmit data during its allocated time slot.

Exemplary Said Processing

Figure 9:
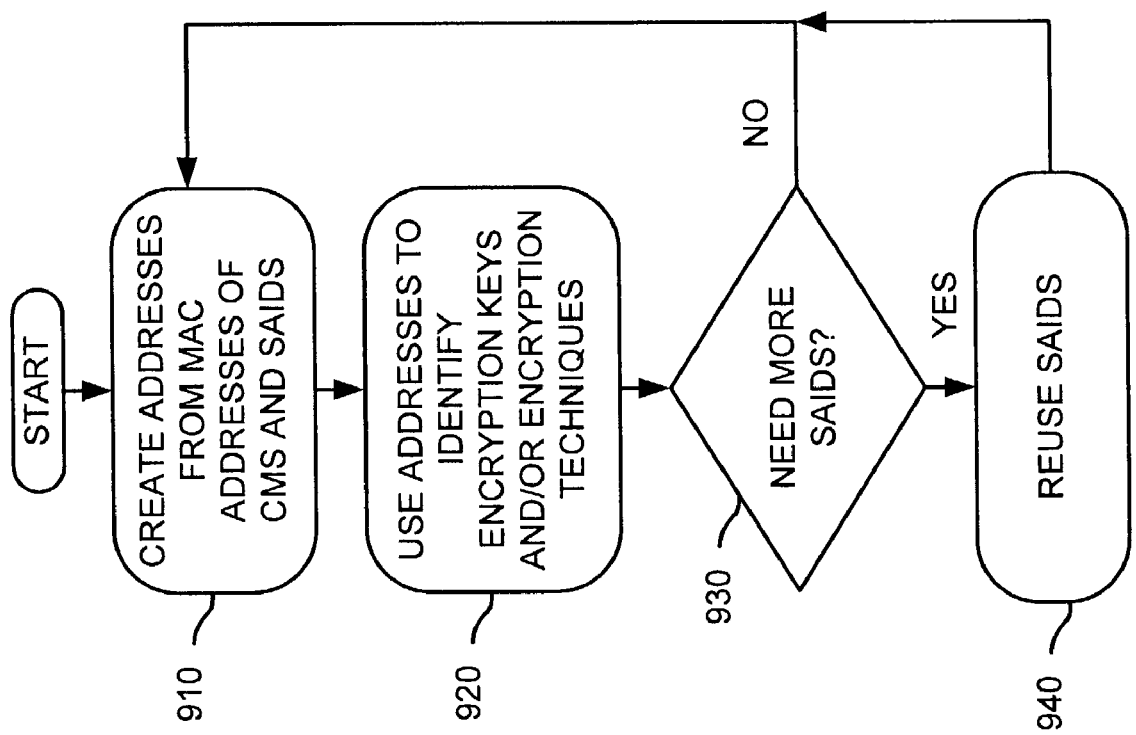
FIG. 9 is a flowchart of exemplary processing for using security association identifiers in a manner consistent with the principles of the invention.

FIG. 9 is a flowchart of exemplary processing for using SAIDs in a manner consistent with the principles of the invention. CMTS 120 may use SAIDs for messages, such as DOCSIS MAC management messages, exchanged with CMs 110. CMTS 120 may assign available SAIDs for communications with CMs 110. CMTS 120 may create an identifier by combining the SAID assigned to CM 110-n and the MAC address of CM 110-n, for example, (act 910). CMTS 120 may use this identifier to identify an encryption key and/or an encryption technique used for communication with CM 110-n (act 920).

When CMTS 120 runs out of available SAIDs, CMTS 120 simply reuses them (acts 930 and 940). Because CMs 110 are identified based on their assigned SAIDs as well as their MAC addresses, reusing the SAIDs does not create any problems when identifying CMs 110 or encryption keys and/or encryption techniques used in communicating with CMs 110.

CONCLUSION

Systems and methods consistent with the principles of the invention provide mechanisms for increasing the number of cable modems that may connect to a CMTS. For example, the systems and methods reuse service identifiers and/or security association identifiers to permit additional cable modems to connect.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

For example, although described in the context of a cable routing system, concepts consistent with the principles of the invention can be implemented in any system, device, or chip that communicates with another system, device, or chip via one or more buses.

In addition, systems and methods have been described as processing data. In implementations consistent with the principles of the invention, systems and methods consistent with the principles of the invention may process different forms of data, such as packet data and data units. A data unit may include any form of data.

Also, while series of acts have been described with regard to the flowcharts of FIGS. 7-9, the order of the acts may differ in other implementations consistent with the principles of the invention. Non-dependent acts may be performed in parallel.

Further, certain portions of the invention have been described as "logic" that performs one or more functions. This logic may include hardware, such as an application specific integrated circuit, software, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the claims and their equivalents.

What is claimed:

1. A method for assigning identifiers to devices communicating via a plurality of virtual channels, the method comprising:
   assigning identifiers to the devices;
   determining whether additional identifiers are needed;
   creating a new virtual channel and a new virtual Media Access Control (MAC) domain when additional identifiers are needed;
   reusing the identifiers for the new virtual channel within the new virtual MAC domain;
   generating security identifiers that identify security information associated with communications with the devices of the new virtual channel;
   combining the security identifiers associated with the devices with addresses of the devices; and
   mapping the combined security identifiers and addresses to the security information associated with communications with the devices.

2. The method of claim 1, where the devices include cable modems within a cable modem system.

3. The method of claim 2, where the identifiers include service identifiers that identify the cable modems.

4. The method of claim 1, where the creating a virtual MAC domain includes:
   linking the new virtual channel to one or more downstream communication channels to form the virtual MAC domain.

5. The method of claim 1, further comprising:
   receiving a bandwidth request from one of the devices via one of the virtual channels, the bandwidth request including one of the identifiers; and
   allocating a transmission opportunity for the one device.

6. The method of claim 5, further comprising:
   identifying the one device based on the one identifier and the one virtual channel.

7. The method of claim 6, where the identifying the one device includes:
   using the one identifier and a channel number associated with the one virtual channel to uniquely identify the one device.

8. The method of claim 1, further comprising:
   generating security identifiers that identify security information associated with communications with the devices.

9. The method of claim 8, further comprising:
   combining the security identifiers associated with the devices with addresses of the devices; and
   mapping the combined security identifiers and addresses to the security information associated with communications with the devices.

10. The method of claim 8, further comprising:
    determining whether additional security identifiers are needed; and
    reusing the security identifiers when additional security identifiers are needed.

11. A system for assigning identifiers to devices communicating via a plurality of upstream channels and one or more downstream channels, the system comprising:
    a processor to implement:
       means for assigning identifiers to the devices;
       means for determining whether additional identifiers are needed;
       means for creating a new upstream channel and a new virtual MAC channel when additional identifiers are needed;
       means for reusing the identifiers for the new upstream channel within the new virtual MAC channel;
       means for generating security identifiers that identify security information associated with communications with the devices of the new virtual channel;
       means for combining the security identifiers associated with the devices with addresses of the devices; and
       means for mapping the combined security identifiers and addresses to the security information associated with communications with the devices.

12. A cable modem termination system, comprising:
    a downstream processor to transmit data to a plurality of cable modems via one or more downstream channels;
    an upstream processor to receive data from the cable modems via one or more upstream channels, at least one of the one or more upstream channels including a plurality of virtual channels; and
    a system manager to:
       assign identifiers to the cable modems,
       determine whether additional identifiers are needed,
       create a new virtual channel and a new virtual MAC domain when additional identifiers are needed,
       reuse the identifiers for the new virtual channel within the new virtual MAC domain;
       generate security identifiers that identify security information associated with communications with the cable modems of the new virtual channel;
       combine the security identifiers associated with the devices with addresses of the cable modems; and
       map the combined security identifiers and addresses to the security information associated with communications with the cable modems.

13. The system of claim 12, where when creating a virtual MAC domain, the system manager is to link the new virtual channel to at least one of the one or more downstream channels to form the virtual MAC domain.

14. The system of claim 12, where when reusing the identifiers, the system manager is to reuse the identifiers within the virtual MAC domain.

15. The system of claim 12, where the upstream processor is further to receive a bandwidth request from one of the cable modems via one of the virtual channels, the bandwidth request including one of the identifiers; and
    where the system further comprises:
       a scheduler to allocate a transmission opportunity for the one cable modem.

16. The system of claim 15, where at least one of the system manager and the scheduler is to identify the one cable modem based on the one identifier and the one virtual channel.

17. The system of claim 16, where when identifying the one cable modem, the at least one of the system manager and the scheduler is to use the one identifier and a channel number associated with the one virtual channel to uniquely identify the one cable modem.

18. The system of claim 12, where the system manager is further to:
   determine whether additional security identifiers are needed, and
   reuse the security identifiers when additional security identifiers are needed.

* * * * *